Aug. 22, 1944.  W. A. LEBUS  2,356,326
GASOLINE TANK FITTING
Filed Aug. 25, 1941  2 Sheets-Sheet 2
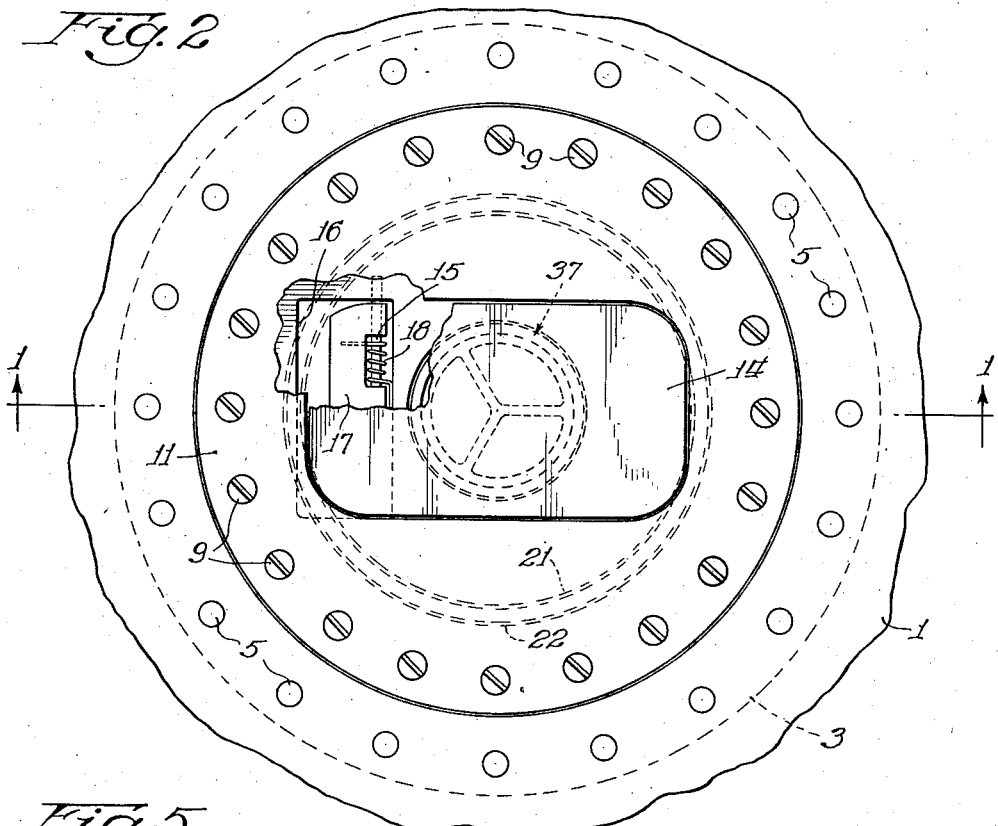
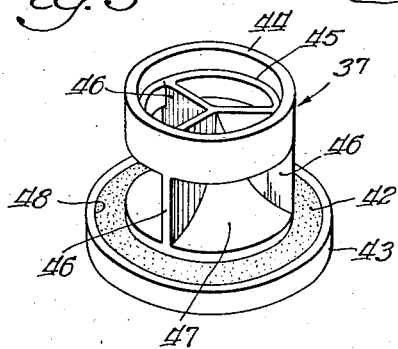
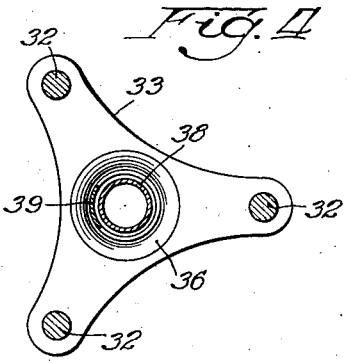
Witness:
V. Siljander
Inventor:
William A. Lebus
By: Hill and Hill
Attys.

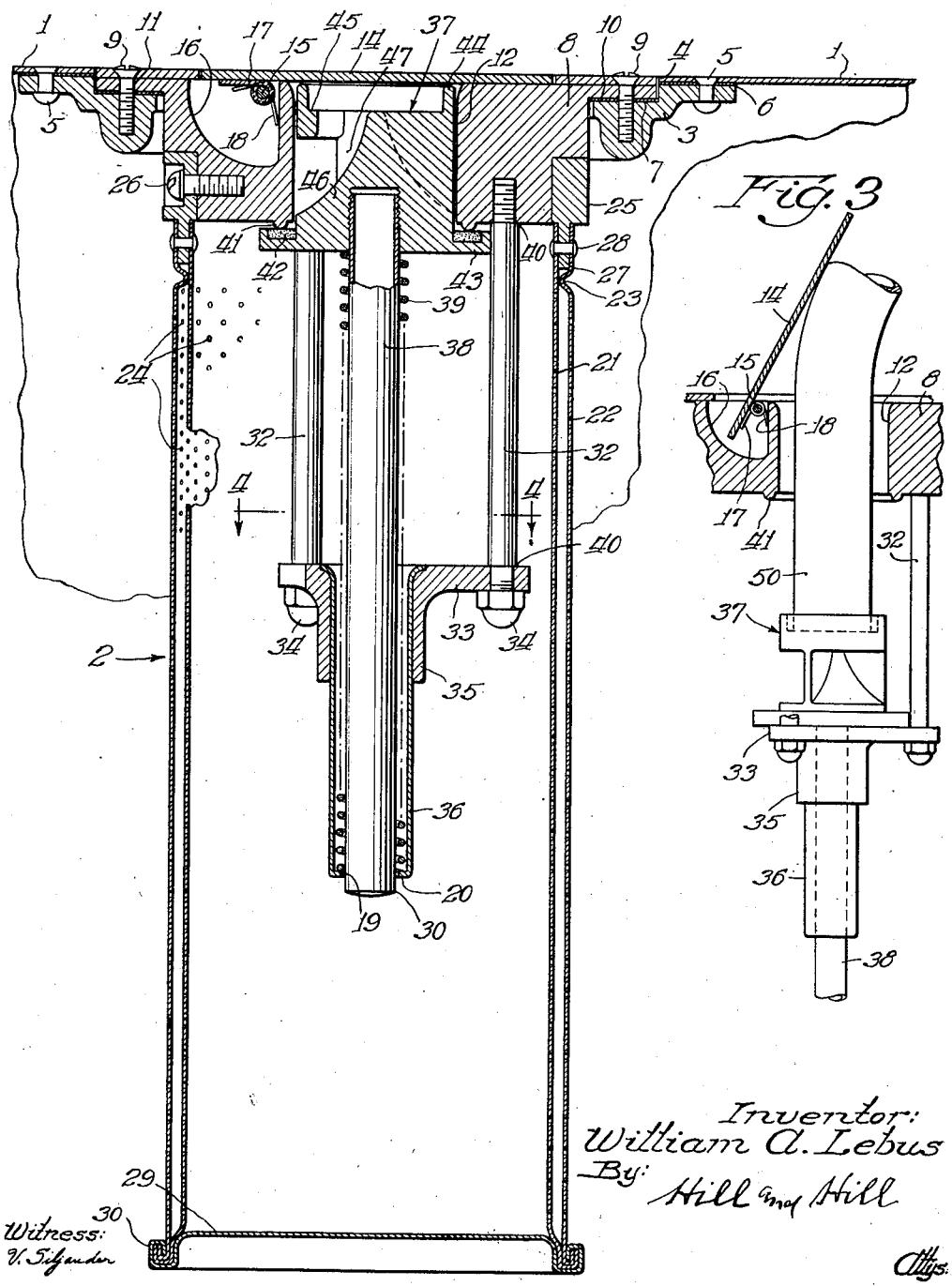

Patented Aug. 22, 1944

2,356,326

UNITED STATES PATENT OFFICE 2,356,326

GASOLINE TANK FITTING

William A. Lebus, Chicago, Ill., assignor to Protectoseal Company of America, Inc., Chicago, Ill., a corporation of Illinois Application August 25, 1941, Serial No. 408,194

6 Claims. (Cl. 284—14)

My invention relates to gasoline tank fittings and more particularly it relates to fittings suitable for use with tanks adapted to be installed directly in an aeroplane wing.

It is well known to those familiar with the art that gasoline tanks are subjected to internal pressure by mechanical means and the invention has as one of its objects the provision of an improved tank fitting adapted as a fire baffle and a strainer and including a valve so arranged that internal pressure within a tank on which the fitting is mounted correspondingly increases the pressure of the valve upon its seat. The fitting is preferably adapted for mounting on tanks of aeroplanes used as dive bombers, since in diving the plane takes a position that the gasoline contents of the tank press against the valve and the liquid pressure also adds to the pressure of the valve upon its seat.

Any projection or depression on the wing surface is obviously objectionable and another object of the invention is the provision of improvements in fittings for gasoline tanks mounted in aeroplane wings whereby the fitting is adapted to be installed flush with the surface of the skin or cover of the wing.

A further object of the invention is the provision of an improved tank fitting of the kind described, the improvements including a threadless valve cap and other features enabling the fitting to be opened to replenish the supply of gasoline without the use of tools and merely by thrusting a nozzle into the valve port.

Still another object of the invention is to provide an improved tank fitting of the kind described which is easily installed, adapted for convenient manipulation to open and close, inexpensive to manufacture, durable and generally satisfactory for its intended purpose.

Many other objects and advantages of the construction herein shown and described will be obvious to those skilled in the art from the disclosure herein given.

To this end the invention consists in the novel construction, arrangement and combination of parts herein shown and described, and more particularly pointed out in the claims.

In the drawings, wherein like reference characters indicate like or corresponding parts:

Fig. 1 is a view along the line 1—1 of Fig. 2 wherein a tank fitting is illustrated as mounted on the cover or skin of an aeroplane wing and forms a closure device for a tank positioned within the aeroplane wing;

Fig. 2 is a plan view of the tank fitting and of a fragmentary portion of the aeroplane wing on which the fitting is mounted;

Fig. 3 is a view of a portion of the fitting including a valve shown in open position and a cover tilted back to permit a hose nozzle to be inserted in the fitting for delivery of gasoline to the tank;

Fig. 4 is a view along the line 4—4 of Fig. 1; and

Fig. 5 is a perspective view of the valve forming a portion of the device.

Referring now more particularly to the drawings, the numeral 1 generally designates the top skin or cover of an aeroplane wing on which is mounted a fitting generally designated by the numeral 2. The cover 1 has a circular opening 4 and the fitting 2 provides an annular ring member 3 and a gasket 6 fastened by rivets 5 to the marginal edge portions of the cover 1 bounding the opening.

The upper end of the fitting 2 also comprises a circular plate 11 closely fitting the opening 4 and a head member 8 having a smooth walled opening therethrough extending from its external face to its internal face and providing a port 12 for insertion of a nozzle. The member 8 has a circular flange 10 resting upon and connected with the ring member 3 by a plurality of screw bolts 9, and a gasket 7 providing a seal between the member and the flange. The ring member 3 is angularly offset as shown to provide a recess adapted to receive the flange 10, the recess being of such a depth that the plate 11 is flush with the wing cover 1.

A spring pressed tiltable lid 14, providing a cover for the port 12, is shown in closed position in Fig. 1 and in open position in Fig. 3. A hinge plate 17 tiltably connects the lid 14 with a pivot member 15, positioned in a recess 16 provided by the head member 8. A coil spring 18, mounted on the member 15, normally maintains the lid 14 in its closed position but yields to permit the lid to be moved to the open position shown in Fig. 3, wherein an inserted hose nozzle 50 prevents the lid from closing. The plate 11 and lid 14, being flush with the wing cover 1, do not interfere in any way with the flow of air over the wing surface.

A flame arrestor comprising concentric closely spaced inner and outer perforated plates, respectively designated by the numerals 21 and 22, and a bottom plate 29 is suspended from the top member 8. A ring member 25, fastened to the member 8 by a plurality of screw bolts 26, provides an integral downwardly projecting annular member 27 positioned between the upper ends of the plates 21 and 22. The plates 21 and 22 are fastened to the member 27 by a plurality of rivets 28 and are fastened to the bottom member 29 by a flanged joint 30. Each of the plates 21 and 22 have a plurality of perforations 24 of a size suitable to permit flow of gas but small enough to quench or prevent flames within the arrestor from passing through the perforations.

A spider shaped plate 33, suspended from and fastened to the member 8 by rods 32, provides a central downwardly extending sleeve member 35 concentric with the port 12 in the member 8. The ends of the rods 32 are offset to provide shoulders 40 and the upper offset ends have threaded connections with the member 8. The lower ends of the rods 32 have nuts 34 threaded thereon to clamp the plate 33 against the adjacent shoulders 40.

A valve member 37, shown in perspective in Fig. 5 and normally closing the port 12 in the member 8, has a stem 38 extending downwardly and projecting through the lower end of a tubular member 36 carried by the member 33. The lower end 19 of the tubular member 36 is surrounded by a shoulder 20 serving as an abutment for the lower end of a spring 39 coiled about the stem. The upper end of the spring 39 bears against and yieldingly holds the valve member 37 in its closed position as shown in Fig. 1.

The valve member 37 is preferably integrally formed and comprises an upper portion 44 adapted to fit within the port 12 in the member 8 and has an inwardly projecting annular shelf 45 from which three equally spaced webs 46 extend downwardly to connect with a member 47 converging upwardly from the bottom portion of the valve member. The bottom portion of the valve member 37 comprises a disk 43 having a diameter substantially larger than the port 12 or the base of the upwardly converging member 47. The annular portion of the disk 43 projecting beyond the member 47 has a recess 48 in its upper face containing a gasket 42 adapted to bear against an annular valve seat 41 provided on the lower face of the member 8 and extending around the port 12.

The spring 39 normally holds the valve member 37 closed with the gasket 42 bearing against the seat 41. The valve opening is a minimum since the inner diameter of the annular shelf 45 is approximately equal to the diameter of the inserted hose nozzle 50 as best shown in Fig. 3. The rods 32 supporting the member 33 from the member 8, are so spaced that the edges of the disk 43 have a sliding fit therewith. The rods 32 thereby also serve as guides for the valve member 37 as it is pushed inwardly to open position by insertion of the nozzle 50 and as it is returned to closed position by pressure of the spring 39 thereon when the nozzle is removed.

In order to insert the nozzle 50 through the port 12 all that is necessary is to tilt the spring pressed lid 14 to open position and press the nozzle against and move the valve member 37 from its raised or closed position in Fig. 1 to the open and depressed position of Fig. 3 before opening the usual nozzle valve in order to discharge gasoline. The webs 46 divide the stream of gasoline and the flow is accelerated radially beyond the disk 43 by the concavely curved faces 47 of the member 37. Upon completion of the filling operation, the nozzle is pulled out and the lid 14 closes by the action of the spring 18. Meanwhile the valve member 37 is moved by the spring 39 to closed position with the ring 42 pressed against the seat 41. The valve structure is such that any pressure within the tank against the valve 37, either vapor or liquid, tends to press the ring 42 more firmly against the seat 41.

Thus it will be seen that the invention provides improvements in a tank fitting of the kind described whereby the fitting is adapted to be installed in an aeroplane wing and flush with the outer face of the wing. It also provides a valve mechanism operable to open and close without the use of tools and so constructed that pressures within the tank tend to maintain the valve closely pressed upon its seat.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A closure unit associated with an opening in the wall of a tank comprising a fitting having sealed connection with said wall, said fitting having a smooth cylindrical bore extending from its external face to its internal face and providing a port therein, a valve for opening and closing said port comprising means for sealing said port and having an extended generally cylindrical apertured head slidably fitting in and movable into and out of said cylindrical bore and nested within said bore to aid in seating said valve and closing the port, the upper end of the head of said valve, when seated, being substantially flush with the external face of the fitting, a stem for said valve, and means depending from said fitting and coacting to guide said valve stem at a point remote from said fitting and including resilient means for normally urging said valve into closed position, said depending means including spaced guide rods secured in said fitting in sliding contact with the edge of said valve for guiding the valve whenever said valve head is moved out of the port during the filling operation of said tank.

2. A closure unit associated with an opening in the wall of a tank comprising a fitting having sealed connection with said wall, said fitting having a smooth bore extending from its external face to its internal face and providing a port therein, a valve for opening and closing said port comprising means for sealing said port and having an extended generally cylindrical head movable into and out of said bore and normally nested within said bore to aid in seating said valve and closing the port, the upper end of the head of said valve when seated being substantially flush with the external face of the fitting, and a valve stem for said valve, the upper end of said head having flanged means for the reception of the end of a tank filling nozzle to prevent the latter from slipping off of the valve head when said nozzle is used to depress and open said valve, said head having apertures therein communicating between said flanged nozzle receiving portion thereof and the exterior of the valve to allow passage of fluid from the nozzle end into said tank when said valve is depressed, spring carrying means depending from said fitting and coacting to guide said valve stem at a point remote from said fitting and resilient means for normally urging said valve into closed position carried by said spring carrying means, said depending spring carrying means including circumferentially disposed guide members for guiding the valve whenever said valve head is moved out of the bore during the filling operation of said tank.

3. In a tank fitting of the kind described, the combination of a cap member having an opening therethrough extending from the external face of the cap member to the internal face thereof and providing a smooth walled cylindrical port, means forming a sealed connection of the fitting with the tank cover, a lid covering said port, a valve having an apertured cylindrical head normally nested in said opening and movable into and completely out of said opening, said valve being movable away from and toward the cap member to open and close the port, a valve stem secured to and depending from said valve, parallel spaced rods depending from said cap member and being circumferentially disposed around the edge of the valve in sliding contact therewith, a spring support carried by said rods, and spring means carried by said spring support and adapted to normally hold the valve in closed position and to yield to permit the valve to be opened by a thrust thereon of a nozzle or the like when bodily inserted into and through the smooth walled port.

4. In a tank fitting of the kind described, the combination of a cap member having an opening therethrough extending from the external face of the cap member to the internal face thereof and providing a smooth tubular port for permitting the unobstructed bodily insertion of a nozzle therethrough, means forming a sealed connection of the fitting flush with the top of the tank, a spring pressed lid covering said port, a valve having a generally cylindrical apertured head movable into and completely out of said opening in the cap member, said head normally being disposed within said opening to a point adjacent said lid and the valve having sealing contact with the internal open end of said port, a valve stem secured to and depending from said valve, parallel valve guiding members disposed circumferentially around and in sliding contact with the edge of the valve, said valve being movable away and toward the cap member to open and close the port, and spring means adapted to normally hold the valve in closed position and to yield to permit the valve to be opened by a thrust thereon of a nozzle or the like inserted in the port.

5. In a tank fitting of the kind described, the combination of a cap member having an opening therethrough extending from the external face of the cap member to the internal face thereof and providing a smooth cylindrical port for the free and bodily insertion of a nozzle, a valve adapted to open and close the port, said valve having an apertured generally cylindrical head movable into and completely out of said opening, a valve stem projecting away from the valve, means depending from said cap member to guide and support the valve stem, said depending means including parallel valve guiding members spaced circumferentially around and in sliding contact with the edge of the valve and coacting with the peripheral edge of said valve to guide the same into said smooth cylindrical port to close the same and resilient means adapted to normally hold the valve in closed position to yield to permit the valve to be opened by a thrust thereon.

6. In a tank fitting of the kind described, the combination of a cap member having an opening therethrough extending from the external face of the cap member to the internal face thereof and providing an internally smooth surfaced port for the insertion of a nozzle therethrough, means forming a sealed connection of the fitting flush with the tank, a valve adapted to open and close one end of the port, said valve having a recessed head extending substantially through said opening to adjacent the outer end thereof for centrally receiving the end of said nozzle, a valve stem projecting away from the valve, means providing a guide and a support for the valve stem and also coacting with said valve to guide said valve head into and out of said opening, and resilient means adapted to normally hold the valve in closed position and to yield to permit the valve to be opened by a thrust thereon of a nozzle or the like.

WILLIAM A. LEBUS.